United States Patent Office 3,444,785
Patented May 20, 1969

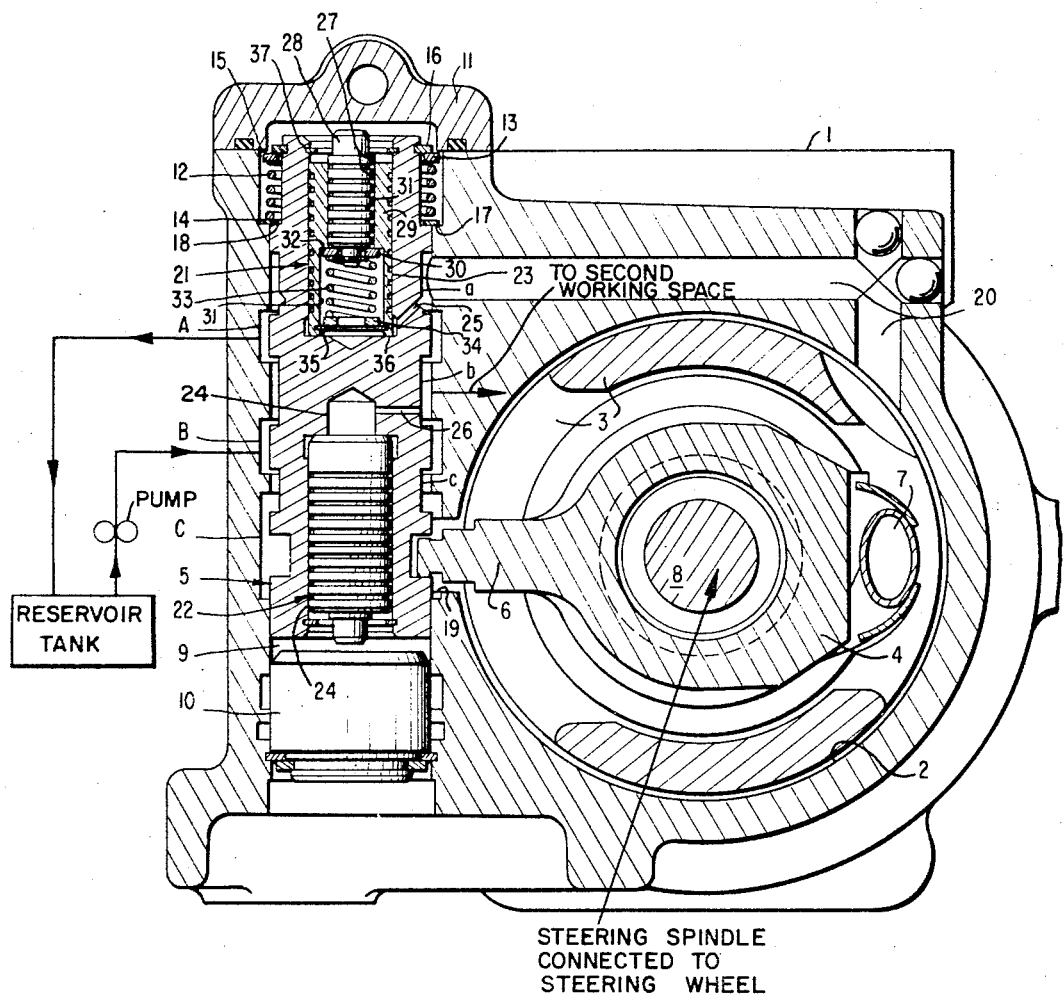

3,444,785
SERVO-STEERING MECHANISM FOR MOTOR
VEHICLES
Klaus Katz, Stuttgart, and Arwed von Koch, Stuttgart-Sonnenberg, Germany, assignors to Daimler-Benz Aktiengesellschaft, Stuttgart-Unterturkheim, Germany
Filed June 19, 1967, Ser. No. 646,836
Claims priority, application Germany, June 24, 1966,
D 50,383
Int. Cl. F15b 13/14
U.S. Cl. 91—434
17 Claims

ABSTRACT OF THE DISCLOSURE

A servo-steering mechanism for motor vehicles, in which a slide valve structure, actuated by a transmitter element responsive to the manual force applied at the steering wheel, is adapted to be displaced within a bore provided in a housing, whereby the slide valve structure includes two axial bores, each accommodating therein a reaction piston, and whereby the control slide valve member valves the pressure medium supplied from a pressure medium source in such a manner that in its normal position, the pressure medium is conducted directly back to the discharge substantially without throttling while, depending on the movement of the slide valve from the normal position in one or the other direction, a pressure build-up is produced in the respective working space of the cylinder by means of the hydraulic pressure medium; each axial bore provided in the slide valve accommodates a two-partite reaction piston and is in communication by way of a bore with a corresponding working cylinder so that the excess pressure is able to form a first reaction force; a spring normally causes the two piston parts to move initially as a unit while the first reaction force is effective, and the two-partite reaction piston structure is so constructed and arranged that after the pressure in the corresponding working cylinder exceeds the oppositely acting spring force of this spring, relative movement takes place, and a second reaction force becomes effective to which is added the first reaction force or a force derived from the first reaction force.

BACKGROUND OF THE INVENTION

The present invention relates to a servo-steering mechanism for motor vehicles having a servo-motor assisting the manual force at the steering wheel, which is controlled by way of a control slide valve in dependence on a transmitter element responding to movements of a steering wheel, and in which a first reaction force derived from the respective servo-force and acting in opposition to the manual force is effective between the control slide valve member and the respective reaction piston, and which includes an installation for the limitation of the manual force in which, for purposes of eliminating the first reaction force, means are provided limiting the relative movement between the control slide valve member and the reaction pistons, and in which, for the formation of a second reaction force acting in opposition to the manual force, elastic or springy means are also provided engaging at the force-transmitting reaction piston.

SUMMARY OF THE INVENTION

The purposes underlying the present invention essentially reside in improving a servo-steering mechanism of the aforementioned type in particular to the effect that with increasing moments at the steering shaft, a road-contact or road-feel true to reality is supplied to the driver, for example, of a commercial-type vehicle, by way of the manual force to be applied at the steering wheel.

According to one proposal of the present invention, the underlying problems are solved by the present invention in a servo-steering mechanism of the aforementioned type in that the first reaction force or a force derived therefrom is adapted to be added to the second reaction force.

The advantage is realized by the present invention that the magnitude of the manual force within the range of the manual force limitation is no longer adapted to be influenced exclusively by the elastic means initiating the manual force limitation but additionally by the servo-force of the servo-motor. This means, within the range of the manual force limitation, in which the reaction force produced by the servo-force at the control slide valve member and therewith the direct road-contact for the driver is eliminated in the known prior art servo-steering mechanisms, there is achieved by the present invention a reduced increase of the manual force in dependence on the increasing steering shaft moment or torque. This increase of the manual force also within the range of the manual force limitation provides for the driver, especially during the transportation of heavy pay-loads, a better contact feel to the vehicle. The danger of the occurrence of critical servo-forces in the steering gear is thereby essentially eliminated.

With one embodiment of the servo-steering system according to the present invention, the influencing of the second reaction force, i.e., the influencing of the elastic means acting at the control slide valve in opposition to the manual force, may be achieved by the present invention in that each reaction piston includes two piston parts adapted to move relative to one another against a spring force, of which each piston part is provided with a piston surface adapted to be actuated by the pressure associated with the first reaction force or by a pressure derived therefrom, and of which a piston part is adapted to be supported either directly or indirectly at a fixed housing part.

Accordingly, it is an object of the present invention to provide a servo-steering mechanism of the type described above which eliminates the aforementioned shortcomings and drawbacks encountered with the prior art constructions.

It is another object of the present invention to provide a servo-steering mechanism, particularly for commercial-type vehicles adapted to transport heavy pay-loads, which assures an improved and more realistic road-feel for the driver.

A further object of the present invention resides in a servo-steering mechanism for motor vehicles which transmits to the driver a realistic road contact true to the reality by way of the manual force to be applied at the steering wheel.

Still another object of the present invention resides in a servo-steering mechanism of the type described above in which the danger of the occurrence of critical servo-forces in the steering gear are effectively eliminated.

These and further objects, features, and advantages of the present invention will become more obvious from the following description, when taken in connection with the accompanying drawing which shows, for purposes of illustration only, one embodiment in accordance with the present invention, and wherein:

The single figure is a transverse cross-sectional view through the housing of a steering gear with a servo-steering mechanism according to the present invention.

Referring now to the drawing, reference numeral 1 designates therein the housing of the steering gear which is provided with a working cylinder 2 for a working piston 3. The working piston 3 is operatively connected with a steering nut 4 so as to be axially non-displaceable but rotatable relative thereto; the steering nut 4 is provided with a radial arm 6 as transmitter element for a control slide valve assembly generally designated by reference numeral 5 and displaceable within the housing 1. The steering nut 4 is connected with steering worm 8 so as to be helically movable relative thereto by way of a conventional ball circulation system of which only one guide channel 7 for the balls (not shown) is visible in the drawing. The steering worm 8 itself is non-rotatably connected in a conventional manner (not illustrated) with the steering wheel of the vehicle.

The control slide valve structure 5 is displaceably arranged within a housing bore 9 which is closed in a pressure-tight and fluid-tight manner at its one end by a closure part 10 and at its other end by a housing cover 11.

The control slide valve assembly 5 is retained in the illustrated, normal position thereof by a prestressed base-load spring 12 which is arranged concentrically to the control slide valve member 5 and axially between ring-shaped abutment disks 13 and 14. In the normal position of the control slide valve 5, the abutment disk 13 abuts simultaneously against an abutment surface 15 of the housing cover 11 and against an abutment surface 16 of the control slide valve 5 whereas the abutment disk 14 abuts in a corresponding manner simultaneously against an abutment surface 17 of the housing 1 and against an abutment surface 18 of the control slide valve 5.

For purposes of controlling the hydraulic pressure medium for the working piston 3 which is drivingly connected in a conventional, non-illustrated manner with the steering shaft at the output side of the steering gear, three annularly shaped control channels A, B and C are accommodated or machined in the housing bore 9. The control channel A is connected with a supply or reservoir tank for the pressure medium thus forming the discharge. The control channel B is connected with a pressure medium pump whereas the control channel C terminates, by way of a housing aperture 19, in the first of the two working spaces formed by the piston 3 in the cylinder 2.

The control slide valve 5 is also provided with three annularly shaped control channels a, b, and c. A channel 20, which is connected with the first working space of the working cylinder 2, terminates within the area of the walls of the bore 9 opposite the control channel a. Depending on the position of the control channel a, the channel 20 is either closed off in a pressure-tight manner or is connected with the control channel A and therewith with the supply tank for the pressure medium. Another channel (not shown) leading to the second working space in the working cylinder 2 terminates within the area of the walls of bore 9 opposite the control channel b.

Depending on the movement of the control slide valve 5 in one or the other direction, the pressure medium supplied constantly by the pump—which in the normal position of the slide valve assembly flows back essentially without throttling and therewith pressureless from the control channel B by way of the control channel A into the supply tank—is throttled at the respective passage between control channel B, on the one hand, and either control channel b or control channel c, on the other. An excess pressure results from this arrangement in one of the two working spaces compared to the pressure in the other working space within the working cylinder 2.

One reaction piston generally designated by reference numerals 21 and 22 is coordinated to a respective one of the two working spaces of the working cylinder 2. Both reaction pistons 21 and 22 are identical in construction and operation—and the reaction piston 21 associated with the first working space in the cylinder 2 is shown in cross section whereas the other reaction piston 22 associated with the other working space is shown in elevational view. The reaction piston 21 is guided in a pressure-tight and fluid-tight manner within an axial bore 23 of the control slide valve member 5. The bore 23 is in communication by way of a radial bore 25, the control channel a in the control slide valve 5 as well as by way of the channel 20 in the housing 1 with the first working space in the working cylinder 2. The reaction piston 22 is guided in a pressure- and fluid-tight manner within an axial bore 24 of the control slide valve member 5. The axial bore 24 is in communication by way of a radial bore 26 and furthermore by way of the control channel b in the control slide valve member 5 with the second working space in the working cylinder 2. The construction of both reaction pistons will be described more fully hereinafter by reference to the reaction piston 21 illustrated in cross section.

The reaction piston 21 includes a shirt-like piston part 29 which is guided in a pressure- and fluid-tight manner within the bore 23. An axial bore 27 is accommodated in the piston part 29 in which a rod-shaped piston part 28 is guided in a fluid-tight and movable manner. The piston part 28 is axially non-displaceably or immovably connected with an abutment disk 30 which is inserted into a coaxial bore 31 provided within the piston part 29 and enlarged in relation to the bore 27. The abutment disk 30 abuts on one side against an abutment surface 32 of the piston part 29. A prestressed coil spring 33 engages with its one end against the other side of the abutment disk 30 and with its other end by way of a further abutment disk 34 at the shirt-like piston part 29. The counter-support for the abutment disk 34 is constituted by a retainer ring 35 inserted into the bore 31 of the piston part 29. The movability of the piston part 29 within the bore 23 is limited at its inner end face by an abutment surface 36 of the control slide valve 5 and at the outer end face by a retainer ring 37 inserted into the bore 23.

OPERATION

The operation of the reaction piston 21 is as follows:

If the arm 6 of the steering nut 4 is rotated by a manual force at the steering wheel in the clockwise direction, then a movement of the control slide valve 5 in the direction toward the housing cover 11 necessarily follows and results therefrom, provided the torque produced by the manual force is larger in its effect on the control slide valve 5 than the prestress of the base-load spring 12. As a result of this change in position of the control slide valve 5, the housing channel 20 is closed off, on the one hand, with respect to the control channel A and is connected, on the other, by way of the bore 25 with the bore 23 for the reaction piston 21. The pressure in the first working space connected with the housing channel 20 thereby becomes effective on the reaction piston 21 and therewith, by way of the control slide valve 5, the steering nut 4 and the steering worm 8, at the steering wheel. If one starts with the assumption that the resultant prestress of the reaction spring 33 effective as return force at the control slide valve 5 is larger than the prestress of the base-load spring 12 acting in the same direction, then essentially three operating ranges result for the operation of the torque to be manually applied at the steering wheel with respect to the torque acting from the vehicle wheels on the steering shaft and therewith for the operation of the reaction pistons:

(a) *Mechanical Operation*

Within this range, the torques applied manually at the steering wheel and acting on the transmitter element 6 (for example—as indicated hereinabove—in the clockwise direction) are equal to or smaller than the counter-torques produced by the prestress of the base-load spring 12 at the steering nut arm 6 by way of the control slide valve 5. Consequently, within the mechanical range, the control slide valve 5 remains in its normal position so that no servo-forces assisting the manual force at the steering wheel occur at the working piston 3. The manual force is directly proportional to the steering force at the steering shaft.

(b) Proportionality range

Within this torques manually applied and acting on the steering nut arm 6 are larger than the counter-torque resulting from the prestress of the base-load spring 12. The control slide valve 5 is therefore displaced from its normal position so that an excess pressure occurs in one of the working spaces of the working cylinder 2. If the reaction piston 21 is to become effective, the steering nut arm 6 has to be rotated in the clockwise direction and an excess pressure will be produced in the first working space by the throttling effect between the control channels B and C. This first working space is in communication by way of the housing channel 20 and the bore 25 with the space 23 for the reaction piston 21. The excess pressure thus becomes effective at the piston parts 28 and 29, which, as a result of the effect of the prestressed reaction spring 33, form at first a unitary structural part displaceable as a unit in the bore 23. The rod-shaped piston part 28 abuts against the housing cover 11, and a first reaction force (return force) becomes effective on the control slide valve 5 which results from the excess pressure in the bore 23 and from the cross section thereof. The first reaction force produces at the steering nut arm 6 a counter-torque which acts opposite the torque applied manually at the steering wheel. Consequently, within the proportionality range the manual force is essentially directly proportional to the excess pressure or servo-pressure at the working piston 3. This proportionality is influenced exclusively by the effect of the base-load spring 12; this effect, however, is relatively slight and can be neglected in the discussion of the present invention.

(c) Range of the manual-force limitation

If the excess pressure at the piston part 29 exceeds the prestress of the reaction spring 33 also acting on this part and directed thereat opposite the excess pressure, then the shirt-shaped piston 29 is displaced relative to the rod-shaped piston part 28. As a result thereof, the return effect (reaction) occurring at the control slide valve 5 is composed of two reaction forces. The first reaction force results from the excess pressure in the bore 23 and from the effective surface of the rod-shaped piston part 28. The second reaction force results from the stress of the reaction spring 33 and from the cross-sectional surface of the shirt-shaped piston part 28 acted upon by the excess pressure.

Upon rotation of steering wheel and therewith of arm 6 in the opposite direction, i.e., toward the closure part 10, an analogous operation now takes place by means of the similarly constructed reaction piston 22 since control channel *b*, in communication with the second working space in cylinder 2 is now closed with respect to control channel A (discharge) but remains in communication with channel B so that pressure builds up in the second working space which becomes effective on reaction piston 22 by way of radial bore 26.

The range of the manual force limitation, influenced as such by the present invention, differs from the operation of known servo-steering mechanisms in that with the latter, the return effect is produced within this range exclusively by reaction springs (if one again neglects the influence of the base-load spring). This means with the known servo-steering systems, the manual force is still determined thereat only by the reaction spring; and the vehicle driver has lost the direct contact at the steering wheel with the road. By the present invention is achieved that the manual force, reduced as such, in comparison to a manual force dependent on the servo-pressure (corresponding to the proportionality range) is adapted to be continued to be influenced by the servo-pressure at the working piston (within the range of the manual force limitation). This is in particular of advantage if, for example, with commercial motor vehicles having very large loads, very high steering forces occur. The driver, with a servo-steering mechanism according to the present invention, then has always a sensing impression and feel of the prevailing steering forces and is not misled by actuation of the steering wheel to permit non-permissive servo-pressures to become effective in the steering gear.

It should finally be noted that in the over-all discussion of this invention, reference is made to a first and a second reaction force. The effect of the base-load spring was not considered. This bar-load spring produces—as already indicated hereinabove—a third reaction force on the control slide valve. The effect of this third reaction force, however, is not significant for the range of the present invention and could therefore be neglected in the consideration of the present invention.

While we have shown and described one embodiment in accordance with the present invention, it is understood that the same is not limited thereto but is suscepible of numerous changes and modifications as known to a person skilled in the art; and we therefore do not wish to be limited to the details shown and described herein but intend to cover all such changes and modifications as are within the knowledge of those skilled in the art.

We claim:

1. A servo-steering mechanism for motor vehicles having a servo-motor assisting the manual force applied at the steering wheel, which is controlled by way of a control slide valve assembly in dependence on a transmitter element responding to the movements of the steering wheel, and in which a first reaction force derived from the respective servo-force and acting in opposition to the manual force becomes effective between the control slide valve and an associated reaction piston, and having a mechanism for limiting the manual force which includes for purposes of eliminating the first reaction force, limit means for limiting the relative movement between the control slide valve member and the reaction piston and, for purposes of producing a second reaction force also opposing the manual force, elastic means engaging at the force-transmitting reaction piston, wherein the improvement comprises means for adding to the second reaction force a force at least derived from the first reaction force.

2. A servo-steering mechanism according to claim 1, wherein the force added to the second reaction force is the first reaction force.

3. A servo-steering mechanism according to claim 1, wherein each reaction piston includes two piston parts movable relative to each other against a spring force, each of the two piston parts being provided with a piston surface adapted to be actuated by a pressure at least derived from the first reaction force, and one of said two piston parts being adapted to be supported against a housing part of the servo-steering mechanism.

4. A servo-steering mechanism according to claim 3, wherein said last-mentioned one piston part is supported directly against the housing part.

5. A servo-steering mechanism according to claim 3, wherein said last-mentioned one piston part is supported indirectly at the housing part.

6. A servo-steering mechanism according to claim 3, wherein the elastic means for the second reaction force is arranged, in effect, between the relatively movable piston parts of a respective reaction piston.

7. A servo-steering mechanism according to claim 6, wherein at least one of the two relatively movable piston parts of a reaction piston is provided with means limiting the relative movement thereof with respect to the other piston part.

8. A servo-steering mechanism according to claim 7, wherein at least one of the two relatively movable piston parts of a reaction piston includes means limiting the relative movement between the control slide valve and the corresponding reaction piston thereof.

9. A servo-steering mechanism for motor vehicles having a servo-motor assisting the manual force applied at the steering wheel, which is controlled by way of a control slide valve assembly in dependence on a transmitter element responding to the movements of the steering wheel, and in which a first reaction force derived from the respective servo-force and acting in opposition to the manual force, becomes effective between the control slide valve and an associated reaction piston, and having a mechanism for limiting the manual force which includes, for purposes of eliminating the first reaction force, limit means for limiting the relative movement between the control slide valve member and the reaction piston and, for purposes of producing a second reaction force, also opposing the manual force, elastic means engaging at the force-transmitting reaction piston, characterized in that each reaction piston includes only two relatively movable piston parts whose relative movement is initially prevented by the second reaction force of said elastic means, and means for merely reducing the increase of said first reaction force at a point at which relative movement between said two piston parts commences and thus the second reaction force becomes effective so that a force at least derived from the first reaction force is added to the second reaction force from said point on.

10. A servo-steering mechanism according to claim 9, wherein at least one of the two relatively movable piston parts of a reaction piston includes means limiting the relative movement between the control slide valve and the corresponding reaction piston thereof.

11. A servo-steering mechanism according to claim 9, wherein the elastic means for the second reaction force is arranged, in effect, between the relatively movable piston parts of a respective reaction piston.

12. A servo-steering mechanism according to claim 9, wherein at least one of the two relatively movable piston parts of a reaction piston is provided with means limiting the relative movement thereof with respect to the other piston part.

13. A servo-steering mechanism according to claim 12, wherein at least one of the two relatively movable piston parts of a reaction piston includes means limiting the relative movement between the control slide valve and the corresponding reaction piston thereof.

14. A servo-steering mechanism according to claim 13, wherein the elastic means for the second reaction force is arranged, in effect, between the relatively movable piston parts of a respective reaction piston.

15. A servo-steering mechanism according to claim 13, wherein each reaction piston includes two piston parts movable relative to each other against a spring force, each of the two piston parts being provided with a piston surface adapted to be actuated by a pressure at least derived from the first reaction force, and one of said two piston parts being adapted to be supported against a housing part of the servo-steering mechanism.

16. A servo-steering mechanism according to claim 15, wherein said control slide valve assembly includes a movable control slide valve member and wherein said reaction pistons are slidably arranged in said movable control slide valve member.

17. A servo-steering mechanism for motor vehicles having a servo-motor assisting the manual force applied at the steering wheel, which is controlled by way of a control slide valve assembly in dependence on a transmitter element responding to the movements of the steering wheel, and in which a first reaction force derived from the respective servo-force and acting in opposition to the manual force becomes effective between the control slide valve and the associated reaction piston, and having a mechanism for limiting the manual force which includes for purposes of eliminating the first reaction force, limit means for limiting the relative movement between the control slide valve member and the reaction piston and, for purposes of producing a second reaction force also opposing the manual force, elastic means engaging at the force-transmitting reaction piston, wherein the improvement comprises, in operative association with said slide valve, first means to provide initially a mechanical operation range upon application of a manual force at the steering wheel in which the control slide valve remains substantially in its normal position, second means including said first reaction force to provide a proportionality range upon application of a manual force at the steering wheel, which exceeds the manual force of the mechanical operation range and which is substantially directly proportional to the servo-pressure, and third means to provide a manual force limitation range, in which a second reaction force becomes effective, including means for adding to the second reaction force a force at least derived from the first reaction force.

References Cited
UNITED STATES PATENTS

| | | | |
|---|---|---|---|
| 2,063,937 | 12/1936 | Kundig | 91—434 |
| 2,922,440 | 1/1960 | Hardy et al. | 91—434 |

PAUL E. MASLOUSKY, *Primary Examiner.*